July 31, 1923.

J. HANMAN ET AL 1,463,695

DETACHABLE WHEEL AND THE LIKE

Filed May 24, 1920

INVENTORS
JOHN HANMAN
GEORGE HAZELTON.
By _____ Atty.

Patented July 31, 1923.

1,463,695

UNITED STATES PATENT OFFICE.

JOHN HANMAN, OF LONDON, ENGLAND, AND GEORGE HAZELTON, OF PORTADOWN, IRELAND.

DETACHABLE WHEEL AND THE LIKE.

Application filed May 24, 1920. Serial No. 383,891.

*To all whom it may concern:*

Be it known that we, JOHN HANMAN and GEORGE HAZELTON, subjects of the King of Great Britain and Ireland, and residents, respectively, of London, England, and Portadown, County Armagh, Ireland, have invented a certain new and useful Improvement in Detachable Wheels and the like, of which the following is a specification.

This invention has reference to improvements in couplings for detachable wheels of vehicles and the like, pulleys, and other articles, and has for its object the construction of an extremely simple attachment providing a strong and solid bearing for the wheel, pulley or other article, and capable of speedy operation when attaching or detaching, and generally applicable to wheels on back or front axles, so as to make the detachable wheels interchangeable.

To render the invention clear, an embodiment is illustrated in the accompanying drawings, wherein:—

Figure 1:
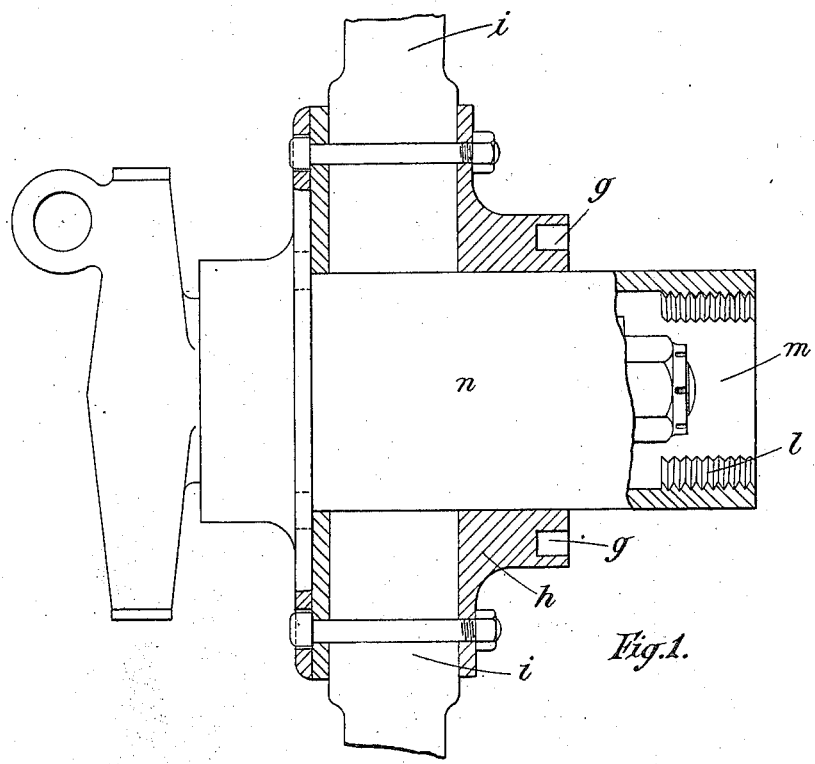
Figure 1 is a part sectional elevation showing a wheel hub in position on an axle.
Figure 2:
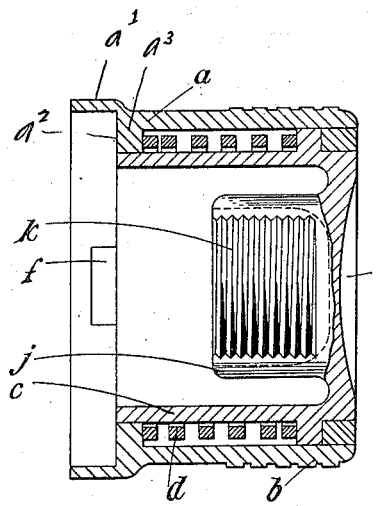
Figure 2 is a sectional elevation of a cap.
Figure 3:
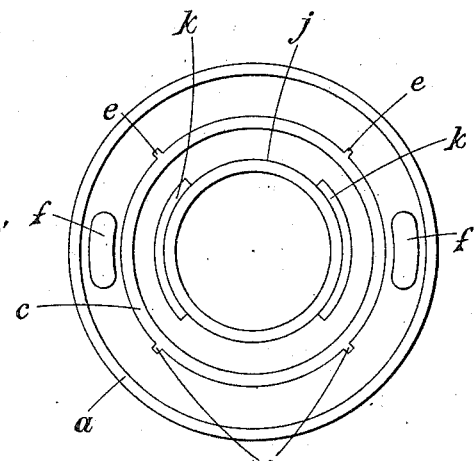
Figure 3 is an interior end view of the cap.

According to this invention, the coupling or securing device consists of an outer member $a$ with the outer surface serrated or roughened or otherwise suitably formed, as at $b$, to provide a good gripping surface for the hand or tool, and an inner member $c$, with a spring $d$ housed between it and the outer member, the inner and outer members being arranged to have relative sliding movement but to rotate together as one member, by means such as ribs $e$.

The outer member or shell $a$ is provided at its inner end with the flange $a'$ for fitting over and receiving the hub extension $h$ of the wheel, while the outer face $a^2$ of the outer shoulder or ring $a^3$ carries the lugs $f$ for fitting into the recesses $g$. As shown, the said lugs $f$ may be diametrically disposed on the face $a^2$ of the shoulder $a^3$ to thereby fit into the recesses in the hub extension of the wheel $i$ to assist in locking the coupling in place on the sleeve $n$ as will hereinafter more fully appear.

The interior of the inner member is shaped to conform to the end of the axle on which the coupling or securing device retains the detachable wheel.

The retention of the coupling or securing device to the end of the axle may be by means of interrupted threads, so that locking and unlocking operations are effected by the combination of sliding and part-rotary movement. There is illustrated an arrangement of inner male member $j$ formed with the sleeve $c$, said male member having interrupted threads $k$, inter-engaging with similar threaded portions $l$ on the interior of the female end $m$ formed on the extremity of the hub sleeve $n$.

In a convenient form, the outer member $a$ is relatively fixed and the inner member $c$ slides, this having the advantage that there are no exterior projecting parts, as the outer member can be turned cylindrical. Also, this outer member $a$ can be grasped by hand and withdrawn away from the wheel to remove the inter-locking lugs $f$ and recesses $g$ above referred to and then given the necessary degree of rotation to unlock the threaded member $k$ of the interior member $c$ from the sleeve female member $m$, whereupon the whole coupling can be removed. Also, when inserting the coupling or securing device on the axle, the inner member is pressed inward against the spring, say by thumb of one hand, the fingers of which are used to grasp the outer member, and rotate the whole of the coupling or securing device.

We claim:—

1. A locking construction for detachable wheels including an outer ring-like shell having an abutment shoulder at its inner end, lugs carried by the shoulder for engaging with recesses on the wheel hub, and an inner member concealed within the shell and having a sliding non-rotative engagement therewith, a spring arranged between the inner member and the ring-like shell for maintaining the same in proper relative position, and the said inner member being provided with a closed end wall carrying at its inner side an inwardly projecting cup-like member provided with mutilated threads on the outer face thereof.

2. A locking construction adapted to cooperate with a demountable wheel including slidably interlocked concentric members, the outer of which carries lugs for engaging with the wheel hub, and the inner of which is formed with an end wall, and an inwardly projecting cup-like portion carried by said end wall and provided with mutilated threads on the outer face thereof.

In testimony whereof we have affixed our signatures hereto this sixth day of May, 1920.

JOHN HANMAN.
GEORGE HAZELTON.